UNITED STATES PATENT OFFICE.

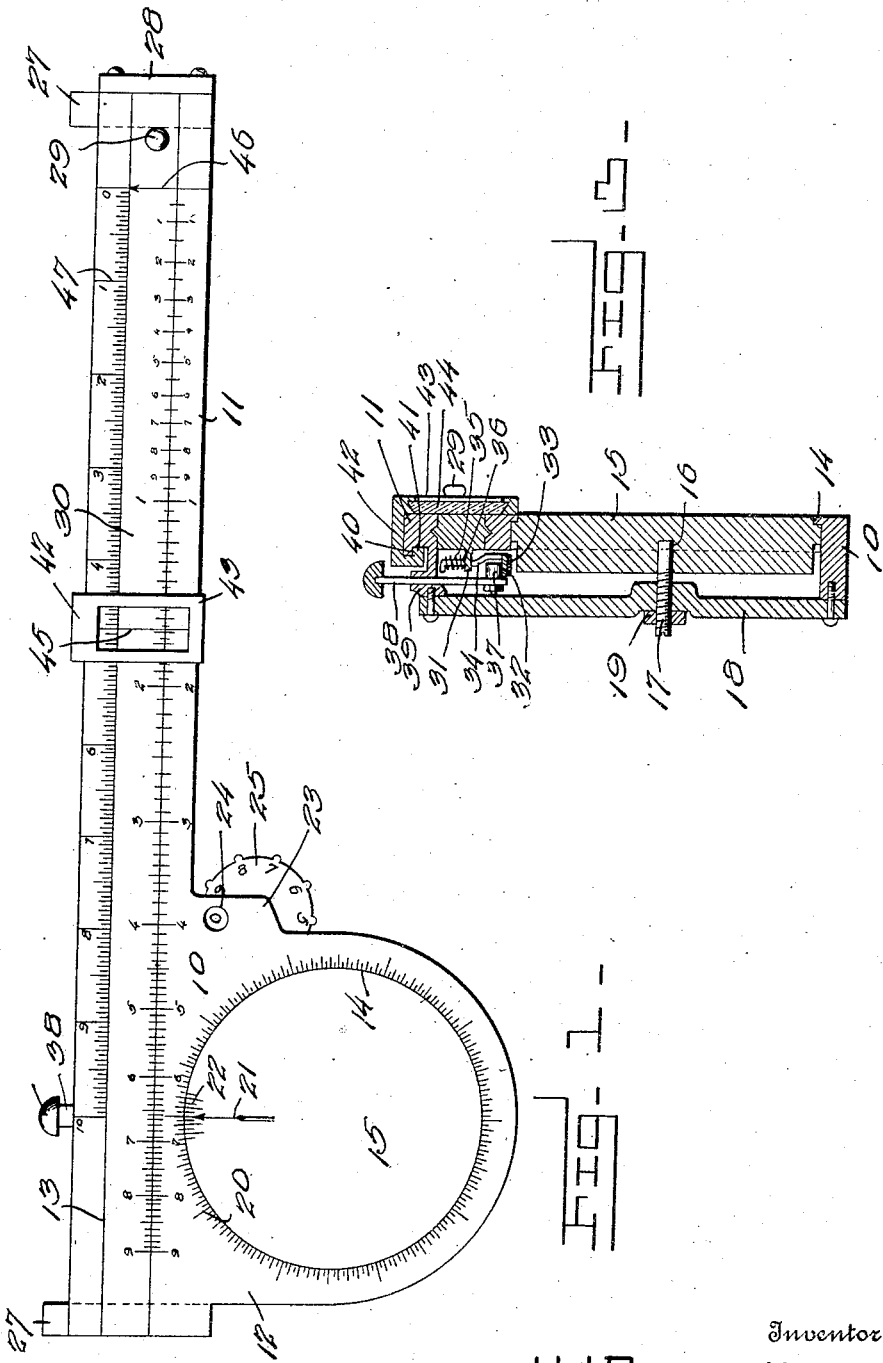

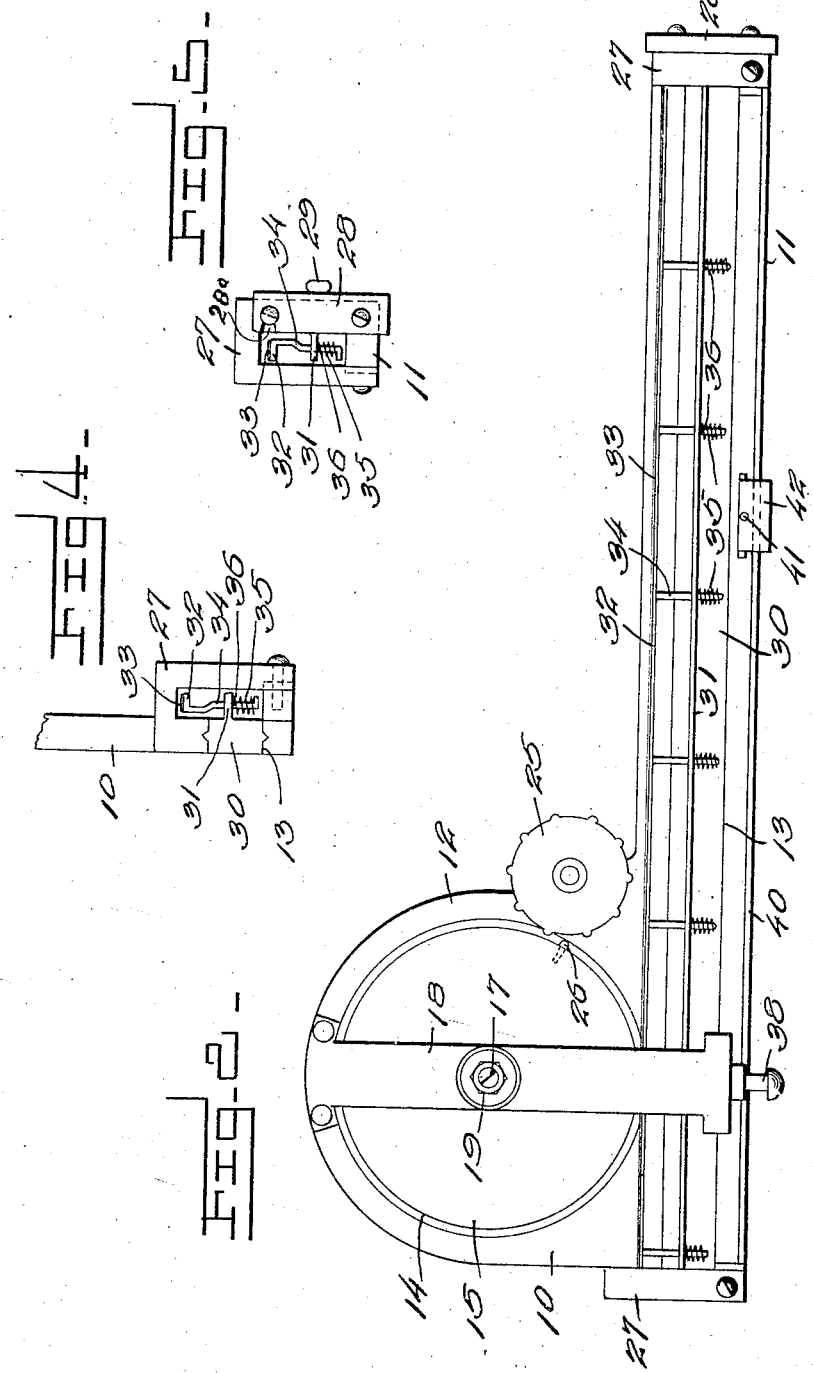

JESSE W. BUZZELL, OF OAKLAND, CALIFORNIA.

SLIDING RULE.

1,062,321.

Specification of Letters Patent.

Patented May 20, 1913.

Application filed October 23, 1912. Serial No. 727,274.

*To all whom it may concern:*

Be it known that I, JESSE W. BUZZELL, a citizen of the United States, residing at Oakland, in the county of Alameda and State of California, have invented new and useful Improvements in Sliding Rules, of which the following is a specification.

This invention relates to slide rules for computations of widely varied kinds, such as addition, subtraction, multiplication and division, as well as the computation of linear measure, or problems expressed in monetary terms.

It is the primary object to provide structural means especially adaptable to the uses named, which may be operated with great rapidity and accuracy. It is sought to enable the construction of such a device in an inexpensive manner, but in durable form. It is also the purpose to construct such a device in compact form adapted to be readily handled, which may be firmly supported in operative position, and which may be stored in a small space.

Additional objects and advantages will be apparent, some being evident from the following specification and from the drawings, in which—

Figure 1 is a top plan view of the device, Fig. 2 is a bottom view thereof, Fig. 3 is a cross section on the line 3—3 of Fig. 2, Fig. 4 is a detail end view, Fig. 5 is a similar view of the opposite end.

There is illustrated a calculating instrument comprising the body frame 10 having the elongated channeled part 11 and the enlarged end 12, the former having the channel 13 extending throughout its length, and the latter being provided with the circular opening 14 therein spaced from the channel and rabbeted on its under side to receive snugly and revolubly against the shoulder thus formed a disk 15. The disk has a central recess 16 on its under side in which there is revolubly seated the end of a stub shaft 17 having its outer end threaded in a suitable bridge piece 18 engaged across the opening and channel. The disk is of more thickness than the depth of the rabbeted part, and it may also be rabbeted slightly at its upper edge so that its face may lie flush with the upper surface of the frame. A suitable lock nut is engaged with the threaded end of the shaft to hold it as adjusted in the bridge. By the use of the adjustable shaft the disk may be maintained in such frictional engagement with the shoulder in the opening as to prevent casual movement of the disk. A suitable dial 20 is inscribed on the border of the opening, and a pointer or arrow 21 on the disk, it being also possible to provide a vernier scale 22 on the disk operative in conjunction with the arrow and dial. The enlargement 12 may be extended at one side, as at 23, an aperture 24 being formed inwardly thereof through which may be observed one figure on a recording dial wheel 25 mounted revolubly on the under side of the frame and having a toothed edge so formed and disposed with relation to the disk 15 as to be engaged by a tooth 26 on the edge of the disk, for movement the distance of one tooth at each revolution of the disk. The channel 13 opens on both the upper end lower side of the frame, and the outer side thereof may be formed integral with the inner part, or separately, it is connected to the inner part by the bridge pieces 27 adjacent each end, which are shown as being formed integral with the outer side and screwed to the inner part of the frame, though this construction may be varied as found most desirable. The sides of the channel are grooved, and it is open on at least one end, while the other may be closed either permanently or by a movable gate piece 28, as shown. Set in the channel snugly, flush with top and bottom, there is a slide 30, having suitable ribs on each side engaged in the grooves of the channel to hold the slide against disengagement. The slide is movable by means of a knob 29 on its upper side. A pendant longitudinal flange 31 is formed on the under side of the slide, having longitudinally spaced transverse apertures therein at suitable intervals. A clutch plate 32 is carried by the flange 31 and spaced therefrom toward the disk, being normally held yieldably spaced from the disk, against the periphery of which it is adapted to be pressed, as will be explained. A suitable friction material 33 is carried by the plate 32 on the side toward the disk. The plate may be stamped from sheet metal and may have integrally formed thereon the supporting arms 34, as shown, each engaged through a respective aperture in the flange 31, their extremities being turned to one side to hold respective springs 35 engaged around each and seated against the flange 31. The arms may have suitable shoulders 36 on their inner portions adapted to engage against the flange and hold the plate at one limit of its movement. The inner ends of the arms are offset upwardly, so that the plate may lie close to the side of the frame, and to permit ready engagement thereagainst of a roller 37 carried at the inner end of a push rod 38, mounted in one of the supports 39 of the bridge piece 18, on the under side of the frame, the push rod projecting outwardly of the side of the frame away from the disk, and having a suitable head thereon for engagement by a finger of a person. When the push rod is pressed in, it will be seen that movement of the slide will result in a corresponding peripheral movement of the disk.

The outer side of the frame is provided with a rib 40 inwardly of which there is engaged a suitable piece 41 carried by the arm 42 which in turn is extended from a hair-line carriage 43 slidable over the top of the portion 11 of the frame, and the slide. This carriage carries a piece of glass 44 having a suitable hairline 45 ruled thereon transversely of the slide and channel. The slide has an indicator arrow 46 thereon terminating at the outer side of the slide, its shaft beginning on the opposite side of the slide. This arrow is formed a sufficient distance from the knob 29 to permit alinement of the arrow and the hairline of the carriage 43 at times. A suitable scale 47 is formed on the outer side of the frame in close abutment with the slide, and beginning at a point alined with the arrow when the slide is at the inner limit of its movement. The channel is closed at that end adjacent the knob 29, so that the slide will be checked with the arrow at zero of the scale. A vernier scale may also be formed on the slide in conjunction with the arrow to indicate smaller units than those of the scale 47. The units of the latter, of course, correspond to those of the dial 20. In addition, the slide being at zero, the pushrod is pressed inward and the slide moved until the arrow registers with the number on the scale which is to form a part of the sum, the push rod is then released, when the springs will disengage the clutch plate from the disk, and the slide is then moved to zero again. The next figure of the sum is then added as before, and the operation repeated until all have been summarized, when the result will be indicated on the dial by the arrow on the disk, if less than the number of units on the dial, and if more, by the recorder wheel in conjunction with the dial. The disk and recorder wheel may be returned to zero by hand. For subtraction, the disk and wheel 25 are set to indicate the minuend, and the slide is then moved to the figure indicating the subtrahend, or the first of a number of figures to be deducted, the push rod being relieved of pressure so that the dial will not be turned, the pushrod is then pressed in, and the slide pulled to zero position. This operation may be repeated with each of a series of figures to be subtracted, and the remainder will then be indicated on the dial.

What is claimed is:

1. A device of the class described comprising a body frame having a guide channel therein, a disk revolubly mounted thereon spaced from the channel, a slide member in the channel, a clutch member mounted longitudinally thereof normally spaced from the disk and yieldably mounted for movement into engagement with the disk, manually operated means on the frame to engage the clutch member to bear it against the disk, means for operating the slide, scales and pointers being formed on the frame, slide, and disk in form and relation for the purposes described.

2. A device of the class described comprising a body frame having a guide channel therein, and being enlarged laterally of the channel, a slide member mounted in the channel, means for moving the slide, a disk mounted revolubly on the enlargement with a portion of its periphery exposed, a longitudinally disposed laterally movable clutch member carried by the slide, adapted to engage the exposed periphery of the disk, resilient means tending to hold it out of such engagement, a push rod carried by the frame adapted to bear upon the clutch member when operated, for rotation of the disk under movement of the slide, the frame disk and slide having coördinated scales and pointers for the purpose named.

3. A device of the class described comprising a body frame having a guide channel therein, a slide member mounted in the channel, means for moving the slide, a disk revolubly mounted on the frame, having a portion of its periphery exposed toward the slide, a plate having a plurality of fingers slidably engaged in the slide, said plate being adapted to be moved into engagement with the disk, resilient elements co-engaged between the slide and fingers to yieldably hold the plate out of said engagement, a transversely disposed push rod extended from the side of the frame and having its inner end disposed to bear on the plate, and coördinated scales and pointers on the frame slide and disk for the purposes named.

4. A device of the class described comprising a frame having a guide channel therein, and being enlarged laterally of the channel, a circular opening being formed centrally of the enlargement spaced from the channel and rabbeted on its inner side, a disk snugly and revolubly engaged therein, a bridge member across the opening on the under side of the frame, a shaft engaged therethrough to bear upon the disk at its center, the shaft being threaded in the bridge, and adapted to be operated to hold the disk against the rabbet of the opening against casual rotation, a slide in the channel, a movable clutch member extended longitudinally thereof means to move clutch member against the disk for rotation of the disk under movement of the slide, means to hold the clutch member yieldably out of engagement with the disk, and scales and pointers on the frame slide and disk, for the purposes named.

5. A device of the class described comprising a body frame, having a guide channel therein, a disk revolubly mounted on the frame laterally of the channel, a slide in the channel, means operable at will for converting sliding movement of the slide into the rotary movement of the disk, an open frame slidable on the frame over the channel and slide a hair-line element in the last named frame disposed transversely of the channel, scales adjacent the channel and disk and on the slide, and pointers on the slide and disk for the purposes named.

6. A device of the class described comprising a flat frame member including an elongated portion and a lateral enlargement, a channel having grooved sides formed longitudinally of the elongated portion and open at one end, a circular opening formed in the enlargement and rabbeted on the under side, a slide and revoluble disk fitted snugly in the channel and opening respectively, the slide and disk being flush with the upper surface of the frame, coördinated scales and pointers on the frame slide and disk for the purposes named, means to operate the slide, means operable at will for converting the movement of the slide into rotary movement of the disk, and an open carriage member slidable longitudinally of the frame extending across the channel, said carriage member having a hair-line element therein transversely of the channel and having an arm engaged beneath the frame, and a rib on the under side of the frame engaged with said arm.

In testimony whereof I have hereunto set my hand in presence of two subscribing witnesses.

JESSE W. BUZZELL.

Witnesses:
H. A. OHRENBERG,
WM. N. THORPE.